United States Patent
Zhao et al.

(10) Patent No.: US 9,942,867 B2
(45) Date of Patent: Apr. 10, 2018

(54) CELLULAR NETWORK SYNCHRONIZATION METHODS AND APPARATUS UNDER SEPARATION ARCHITECTURE

(71) Applicant: HITACHI, LTD., Tokyo (JP)

(72) Inventors: Tao Zhao, Beijing (CN); Miao Jiang, Beijing (CN); Lu Geng, Beijing (CN); Meng Zheng, Beijing (CN); Sheng Zhou, Beijing (CN); Zhisheng Niu, Beijing (CN)

(73) Assignee: HITACHI, LTD., Tokyo (JP)

( * ) Notice: Subject to any disclaimer, the term of this patent is extended or adjusted under 35 U.S.C. 154(b) by 108 days.

(21) Appl. No.: 15/161,558

(22) Filed: May 23, 2016

(65) Prior Publication Data

US 2016/0353399 A1    Dec. 1, 2016

(30) Foreign Application Priority Data

May 29, 2015    (CN) .......................... 2015 1 0289965

(51) Int. Cl.
*G08C 17/00*    (2006.01)
*H04W 56/00*    (2009.01)
(Continued)

(52) U.S. Cl.
CPC ......... *H04W 56/0015* (2013.01); *H04J 11/00* (2013.01); *H04L 5/0053* (2013.01); *H04L 69/28* (2013.01); *H04W 4/005* (2013.01); *H04W 40/005* (2013.01); *H04W 52/0206* (2013.01); *H04W 88/08* (2013.01); *H04W 88/12* (2013.01); *Y02B 60/50* (2013.01)

(58) Field of Classification Search
None
See application file for complete search history.

(56) References Cited

U.S. PATENT DOCUMENTS 6,373,834 B1    4/2002   Lundh et al.
2007/0165677 A1*  7/2007  Monnerat ............ H04B 7/2125
                                                          370/509
(Continued)

FOREIGN PATENT DOCUMENTS

CN         104080178 A      10/2014

OTHER PUBLICATIONS

European Search Report dated Oct. 4, 2016 for European Patent Application No. 16170675.9 (11 pages).

(Continued)

*Primary Examiner* — Otis L Thompson, Jr.
(74) *Attorney, Agent, or Firm* — Volpe and Koenig, P.C.

(57) ABSTRACT

A synchronization apparatus in a control base station is disclosed. A GNSS synchronization unit receives a GNSS signal through a GNSS antenna to obtain time information. A clock generation unit adjusts a clock of the control base station based on the time information provided by the GNSS synchronization unit. A traffic base station synchronization unit transmits and receives information with a traffic base station through a wired connection. A user data sample generation unit generates data required by a mobile user including network time information, and transmits the data to the mobile user equipment through a control base station antenna.

15 Claims, 12 Drawing Sheets

(51) Int. Cl.
*H04W 40/00* (2009.01)
*H04W 4/00* (2018.01)
*H04J 11/00* (2006.01)
*H04L 5/00* (2006.01)
*H04L 29/06* (2006.01)
*H04W 52/02* (2009.01)
*H04W 88/12* (2009.01)
*H04W 88/08* (2009.01)

(56) References Cited

U.S. PATENT DOCUMENTS

| | | | |
|---|---|---|---|
| 2011/0207472 A1* | 8/2011 | Abraham | A47G 33/00 455/456.1 |
| 2011/0287755 A1 | 11/2011 | Cho et al. | |
| 2013/0059592 A1 | 3/2013 | Chakraborty et al. | |
| 2013/0328724 A1* | 12/2013 | Mayor | G01S 5/02 342/450 |
| 2014/0241244 A1* | 8/2014 | Traore | H04W 64/00 370/328 |
| 2014/0295839 A1 | 10/2014 | Wu et al. | |
| 2016/0259061 A1* | 9/2016 | Carter | G01S 19/05 |
| 2016/0286510 A1* | 9/2016 | Soulhi | H04L 63/10 |
| 2016/0345247 A1* | 11/2016 | Kim | H04W 48/16 |
| 2017/0254904 A1* | 9/2017 | Zhodzishsky | G01S 19/04 |

OTHER PUBLICATIONS

IEEE Standard for a Precision Clock Synchronization Protocol for Networked Measurement and Control Systems, IEEE Instrumentation and Measurement Society, IEEE Std 1588-2008, Jul. 24, 2008, 1.1 Scope, 2 pgs.

6.3 Feasibility and benefits of radio-interface based synchronization mechanisms, 3GPP TR 36.872, V12.1.0 (Dec. 2013), 13 pgs.

Digital cellular telecommunications system (Phase 2+); Universal Mobile Telecommunications System (UMTS); LTE; Network Identity and TimeZone (NITZ); Service description; Stage 1, 3GPP TS 22.042 V. 11.0.0, Release 11 (Oct. 2012), 10 pgs.

* cited by examiner

CELLULAR NETWORK SYNCHRONIZATION METHODS AND APPARATUS UNDER SEPARATION ARCHITECTURE

CLAIM OF PRIORITY

The present application claims priority from Chinese patent application CN201510289965.1 filed on May 29, 2015, the content of which is hereby incorporated by reference into this application.

BACKGROUND

The present invention relates to synchronization methods and apparatus for a base station and a user equipment as wireless communication devices, and more particularly, to apparatus and methods for enabling fast synchronization between base stations while the base station dynamically sleep and wake up, as well as apparatus and methods for dynamically and flexibly providing network synchronization for the user equipment utilizing different types of base stations.

Explosive growth of the mobile Internet traffic, as well as the "Internet of Things" trend led by wearable devices, has brought challenges to cellular network in terms of efficiency and flexibility. On one hand, to support the fast growing requirements for traffic amount and traffic rate, the deployment density of base stations which provide wireless access in cellular network is increasing higher. Since the base station part occupies most of the energy consumption in the entire cellular network, the intensification of the base stations causes the energy consumed by the entire network significantly increase. A large part of the base station energy consumption comes from basic power consumption, i.e. the power consumption when there is no radio frequency data transmission, thus sleep of the base station is considered to be one of the approaches for effectively improving network energy efficiency. However, in traditional cellular network, the base stations of various cells are under distributed deployment. Each base station makes decisions independently and lacks cooperation with each other, such that there are holes in network coverage left by a base station after entering sleep. Users in the holes are unable to receive the network service. On the other hand, the popularity of new types of intelligent devices (e.g., wearable devices) advances the demand for inter-device communication. Different from the high capacity requirements for traditional cellular network traffic (e.g., video streaming media traffic), inter-device communication requirements exhibit features such as short packets, small flow, high reliability guarantee. Intensively deployed small cells alone are unable to flexibly provide different services for different traffic requirements well.

In order to meet the challenges on efficiency and flexibility, patent reference 1 (CN104080178A) presents a separation architecture called super cellular. It separates the network coverage into two layers (control coverage and traffic coverage) at the over-the-air interface, accordingly dividing cellular network base stations into two categories: control base station and traffic base station. A control base station remains open to provide access guarantee for cellular network users. Whereas the traffic base station deploys flexibly according to the time-space dynamic characteristics, and dynamically opens and closes (sleep and wake up of the base station), thereby providing network service with high energy efficiency.

However, this separation architecture brings new challenges on the synchronization of cellular network. First, under separation architecture, the base stations have two categories: Control Base Station (CBS) and Traffic Base Station (TBS). User Equipment (UE) is also more and more versatile (e.g., intelligent cellphones, tablet computers, wearable devices, etc.). The more types of network devices increase the complexity and cost of synchronization. Second, under the centralized control of the control base station, the traffic base station will be dynamically assigned to provide high speed data service for users. Base stations without service requirements may be switched to a sleep state. These dynamic base station operations make operation of the network become more flexible, and meanwhile require the network synchronization more flexible and reliable. Third, while the traffic base station is in sleep, when a new high rate traffic request arrives, the control base station may wake up the traffic base station in sleep to provide service for the new traffic request. Whereas the just waked up traffic base station may have been out of synchronization with the network. This requires providing a fast and efficient synchronization scheme for the waked up traffic base station. Moreover, to enable the user traffic to seamlessly switch between multiple traffic base stations, and to utilize multiple traffic base stations to cooperatively provide data service for a single user, the synchronization precision required by the network would be on the order of resource block, and in modern cellular systems would be on the order of sub-microsecond. However, patent reference 1 is focus on network architecture design as well as signaling payload reduction methods, and does not provide the methods for cellular network synchronization under separation architecture.

In patent reference 2 (U.S. Pat. No. 6,373,834B1), presents a method for cellular network synchronization. In this method, a master timing unit and a slave timing unit achieve synchronization by exchanging synchronization signaling which carries time information. Here, the master timing unit and slave timing unit may all serve as a timing unit which starts the synchronization operation. However, this synchronization method is only applicable to wired connected backhaul network, unable to provide synchronization for mobile user equipment, neither providing synchronization scheme for base station in sleep.

In standard reference 3 (IEEE 1588-2008: 24 Jul. 2008. 1.1 Scope), presents the second version of Precision Time Protocol (PTP). Here describes a protocol which provides precise clock synchronization for packet switching wired network. This protocol can achieve a synchronization precision on the order of sub-microsecond within the fast wired local area network. However, it does not involve the time synchronization under wireless network connection, neither does it involve the solution for synchronization in a scenario where the nodes dynamically sleep and wake up.

In standard document 4 (3GPP TR 36.872 V12.1.0 (2013-12). 6.3 Feasibility and benefits of radio-interface based synchronization mechanisms), discusses the feasibility and potential advantages of using radio frequency wireless interface to achieve inter-cell synchronization under existing cellular network standard LTE. Here presents a scheme that achieves synchronization between a small cell and the network as well as synchronization between small cells by way of network listening based on existing signals in LTE. To improve the synchronization precision, the reference considers the way of transmission muting, but it will degrade the network performance. Moreover, there is no frequency synchronization method provided in the reference, and it does not involve the base station synchronization method after introducing base station sleep operation.

In standard reference 5 (3GPP TS 22.042 V11.0.0 Release 11), it specifies a function called Network Identify and Time Zone (NITZ). This function enables a base station to provide time service for user equipment. However, this function is optional. Some network operators do not support this function. In addition, the time precision required by NITZ is only on the order of minute. This scheme cannot provide guarantee for the synchronization precision required by the real-time mobile Internet applications.

SUMMARY

The present invention is presented in view of the above problems, whose purpose is to provide a set of apparatuses and methods for low complexity, low cost synchronization between various types of base stations and user equipments to fully utilize the system structure characteristics of separation architecture to achieve network synchronization requirements.

One of the technical schemes of the present invention is a synchronization apparatus in a control base station. The synchronization apparatus may include: a GNSS synchronization unit configured to receive a GNSS signal through a GNSS antenna to obtain time information; a clock generation unit configured to adjust a clock of the control base station based on the time information provided by the GNSS synchronization unit; a traffic base station synchronization unit configured to transmit and receive information with a traffic base station through a wired connection; and a user data sample generation unit configured to generate data required by a mobile user including network time information, and transmit the data to a mobile user equipment through a control base station antenna.

Wherein, the traffic base station synchronization unit may include: a traffic base station wake up unit configured to send a base station wake up message to a traffic base station in a sleep state through the wired connection; a traffic base station synchronization acknowledgement unit configured to send a base station synchronization message to the traffic base station which has entered an active state through the wired connection; and a traffic base station time correction unit configured to send a base station time message to the traffic base station through the wired connection.

One of the technical schemes of the present invention is a synchronization apparatus in a traffic base station. The synchronization apparatus may include: a control base station synchronization unit configured to transmit and receive information with a control base station through a wired connection; a clock generation unit configured to correct a clock of the traffic base station based on time information provided by the control base station synchronization unit; and a user data sample generation unit configured to generate data required by a mobile user including a network time adjustment information and transmit the data to a mobile user equipment through a traffic base station antenna.

Wherein, the control base station synchronization unit may include: a wake unit configured to transmit a base station awake message to the control base station through the wired connection on condition that a traffic base station in a sleep state is waked up into an awake state; a synchronization acknowledgement unit configured to transmit a base station synchronization acknowledgement message to the control base station through the wired connection; and a time correction unit configured to transmit a base station time correction message to the control base station through the wired connection.

In addition, another technical scheme of the present invention is a cellular network synchronization method under separation architecture, including: receiving, by a control base station, a GNSS signal through a GNSS antenna (i.e. Global Navigation Satellite System antenna) to obtain time information; adjusting, by the control base station, a clock of the control base station based on the time information; transmitting and receiving, by the control base station, information with a traffic base station through a wired connection; transmitting, by the control base station, a base station wake up message to the traffic base station in a sleep state; receiving, by the control base station, a base station awake message transmitted by the traffic base station; transmitting, by the control base station, a base station synchronization message to the traffic base station which has entered an active state; receiving, by the control base station, a base station synchronization acknowledgement message transmitted by the traffic base station; transmitting, by the control base station, a base station time message to the traffic base station; receiving, by the control base station, a base station time correction message transmitted by the traffic base station; and generating, by the control base station, data required by a mobile user including network time information and transmitting the data to a mobile user equipment through a control base station antenna.

The base station time message may include a control base station ID representing a transmission source, a traffic base station ID representing a transmission destination, a message type, the timestamp t1, a first reception time t2 representing a time at which the traffic base station receives the base station synchronization message, a first transmission time t3 representing a time at which the traffic base station transmits the base station synchronization acknowledgement message, and the second reception time t4; the traffic base station calculates a time offset of the traffic base station based on the timestamp t1, the first reception time t2, the first transmission time t3, and the second reception time t4, to correct a clock of the traffic base station.

In accordance with the above technical schemes of the present invention, fast synchronization between the base stations while the base stations dynamically sleep and wake up is achieved. The control base station and the traffic base station may exchange the synchronization signaling through a wired connection. When waking-up a traffic base station in sleep, the control base station may calculate a preset time and embed the preset time into the base station wake up message, to instruct the traffic base station to adjust the clock after wake up. When the traffic base station is in an active state, the control base station may periodically transmit a base station synchronization message to collect the time information in the replies from traffic base station for distributed time offset calculation and adjustment as well as centralized monitoring for synchronization information.

Moreover, another technical scheme of the invention may be a synchronization apparatus in a mobile user equipment, including: a user data sample generation unit configured to receive data transmitted by a control base station including network time information and data transmitted by a traffic base station including a network time adjustment information through a user equipment antenna; and a clock generation unit configured to adjust a clock of a mobile user equipment based on the network time information provided by the control base station and the network time adjustment information provided by the traffic base station.

In view of this, from this technical scheme, different types of base stations can be used to dynamically and flexibly provide network synchronization for mobile user equipment. In this technical scheme, synchronization of the mobile user equipment is guaranteed by two types of base stations (the control base station and the traffic base station) through over-the-air wireless signals. The control base station may synchronize the clock of the mobile user equipment with the cellular network by periodically broadcasting information. The traffic base station may fine adjust the time of the mobile user equipment through network time adjustment information when providing data traffic service for the mobile user equipment.

Thus, according to the present invention, by introducing a new synchronization apparatus in control base stations and traffic base stations, and introducing new signaling between control base stations and traffic base stations, between control base stations and mobile user equipments, between traffic base stations and mobile user equipments, the system structure characteristics of separation architecture can be fully utilized, and synchronization between various types of base stations and mobile user equipments is achieved under limited complexity and controllable cost.

Objects, configurations, and effects of this invention other than those described above will be clarified in the description of the following embodiments.

DETAILED DESCRIPTION OF EMBODIMENTS

The concept of base station in present embodiments is an integral part of the base station physical device and the functional software which logically covers a certain range. In particular implementation, it may be "a base station", "a sector of a base station", "a micro base station", or "a transmission point (TP)", etc.; the radio frequency unit of the base station and the base station processing unit may be integral, and may also be a number of relatively independent modules which connect through network. For simplicity of description, the control base stations and the traffic base stations are collectively referred to herein as base stations.

The present embodiments are explained and illustrated with graphs and examples. However, it is noted that these graphs and examples do not mean that the present embodiments are limited to the particular protocols, interfaces and technologies, etc.

Figure 1:
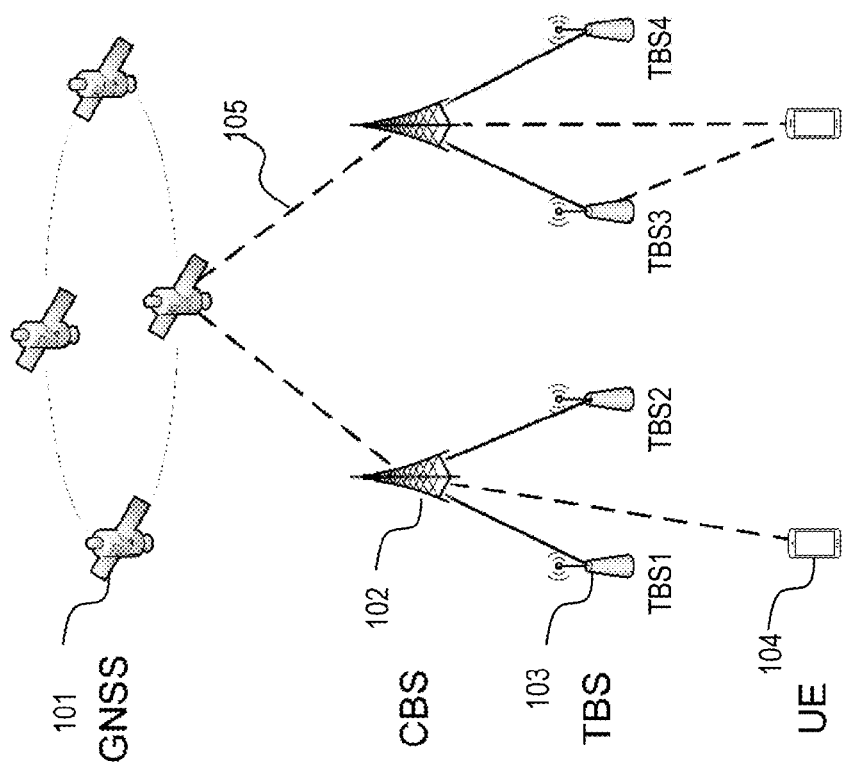
FIG. 1 is a schematic diagram representing a typical application scenario of the present embodiment.

To illustrate the particular implementation of cellular network synchronization under separation architecture, assume that the particular scenario is implemented as FIG. 1. FIG. 1 shows a layered network. At the top layer (the $0^{th}$ layer) is Global Navigation Satellite System (GNSS) 101. At the first layer is control base stations 102 in cellular network under separation architecture. The second layer consists of traffic base stations 103, while the third layer consists of mobile user equipments 104. The structure characteristics of the various layers and the inter-layer interface protocols will be set forth in detail below.

The Global Navigation Satellite System 101 at the top layer (the $0^{th}$ layer) may be GPS of United States, GLONASS of Russia, Beidou of China or the like, or the combination thereof. These satellites are arranged as fixed constellation on the orbit, and carry atomic clocks to remain precise synchronization. These satellites broadcast microwave signals (GNSS signals) 105 on set frequencies, to provide highly precise time information for GNSS receivers. These GNSS receivers may be located on ground. But it should be noted that, to be able to reliably recover the microwave signals 105 broadcasted by the GNSS satellites to obtain time information, direct path (i.e., Line of Sight, LOS) between the satellite and the receiver is required. Therefore the GNSS signals are not applicable in scenarios such as indoor (TBS2 in FIG. 1), underground (TBS 4 in FIG. 1). Moreover, in cellular network under separation architecture, deployment density of base stations (especially traffic base stations) is very high. If GNSS receiver is to be deployed at each base station for clock synchronization, then the cost for network operators would be made substantially increased. Whereas for the mobile user, additionally installing GNSS receiver on lightweight user equipment (e.g., wearable device) will increase its weight and cost, meanwhile accelerating the power consumption of the device as well. In sum, although deploying GNSS signal receiver at each base station and user equipment seems to be a simple and straightforward scheme for solving the synchronization problems, it is not practical in cellular network under separation architecture.

The first layer of the network consists of control base stations 102. Each of the control base stations 102 is required to be equipped with a GNSS receiver, to obtain highly precise time information from the $0^{th}$ layer 101. The reasons are summarized as follows. First, in cellular network under separation architecture, the control base station has larger station site and will be deployed in open space on ground, thus the availability of GNSS signals 105 at the control base station can be guaranteed. Second, the control base station covers larger geographical area. For instance, one control base station may be responsible for tens or hundreds of traffic base stations within the coverage range of the control base station. This results in a relatively small cost of deploying GNSS receiver, making it easy to control the overall cost of the network.

Figure 2:
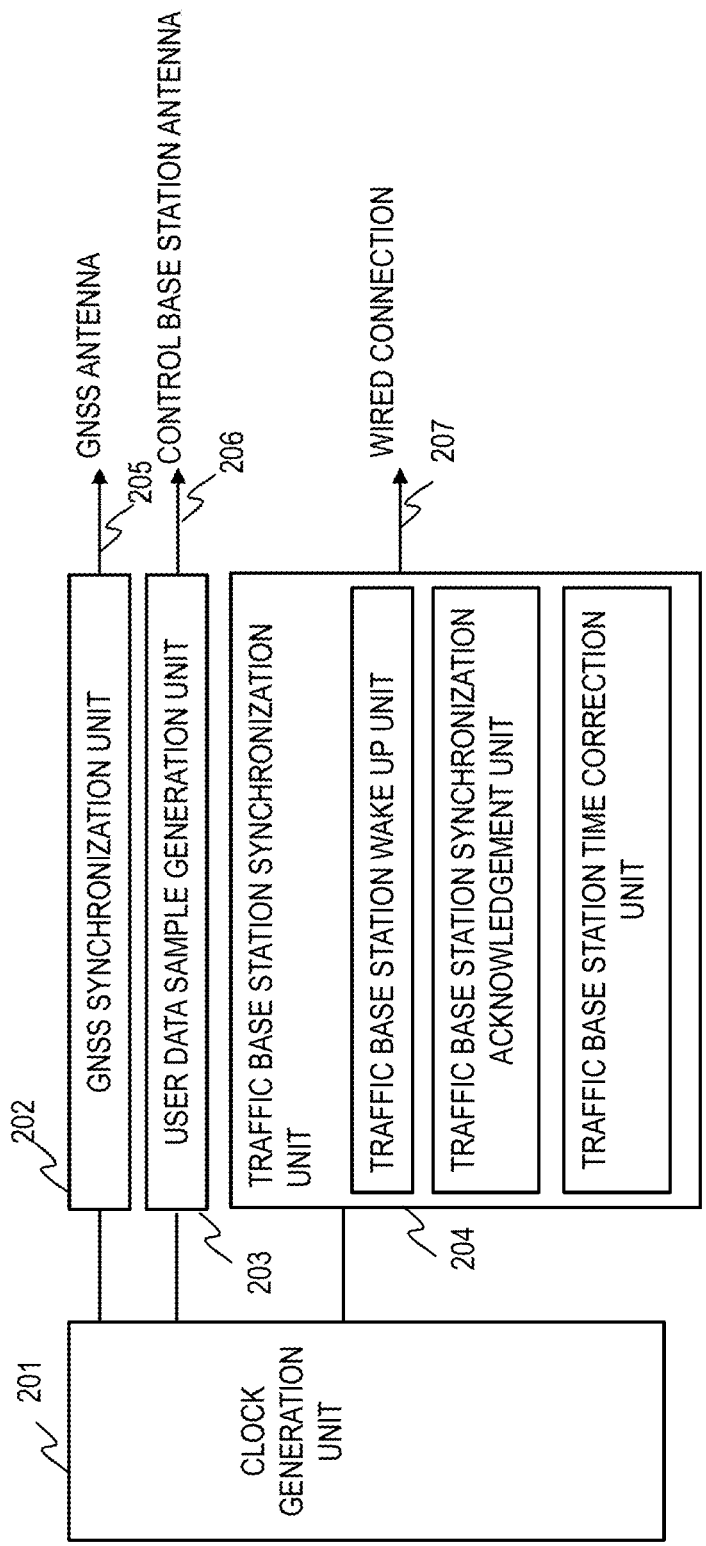
FIG. 2 is a structural block diagram of a control base station synchronization apparatus under separation architecture of the present embodiment.

FIG. 2 is a structural block diagram of a synchronization apparatus in a control base station 102 of the present embodiment. The apparatus comprises: GNSS synchronization unit 202, to receive GNSS signal 105 through GNSS antenna 205, and to obtain highly precise time information to be provided to clock generation unit 201; clock generation unit 201, to adjust a clock of the control base station based on the highly precise time information provided by the GNSS synchronization unit 202, to correct the time error; traffic base station synchronization unit 204, to convey the time information from the clock generation unit 201 to the governed traffic base stations 103 through a wired connection 207; user data sample generation unit 203, to generate data required by a mobile user including network time information, and transmit to a mobile user equipment 104 through a control base station antenna 206, to provide synchronization support and network information for the mobile user equipment 104. Wherein, the traffic base station synchronization unit 204 comprises: traffic base station wake up unit, to transmit a base station wake up message to a traffic base station in a sleep state; traffic base station synchronization acknowledgement unit, to transmit a base station synchronization message to the traffic base station which has entered an active state through a wired connection 207; traffic base station time correction unit, to transmit a base station time message to the traffic base station through the wired connection 207. Signaling interaction for the synchronization between the control base station and the traffic base station will be described in detail hereinafter.

The second layer of the network consists of traffic base stations 103. The traffic base stations 103 are connected to the control base stations through wired network. This particular network implementation may be wavelength division multiplexing (WDM) optical transport network, or may be Carrier Ethernet, etc. In the particular implementation, this wired connection is used to synchronize a control base station and the traffic base stations within the coverage range of the control base station. Under this synchronization scheme, there is no need to deploy GNSS receiver at each traffic base station, thereby saving part of the cost. Moreover, it can provide reliable synchronization for traffic base stations deployed in environments such as indoor or underground, thereby improving the network capacity.

Figure 3:
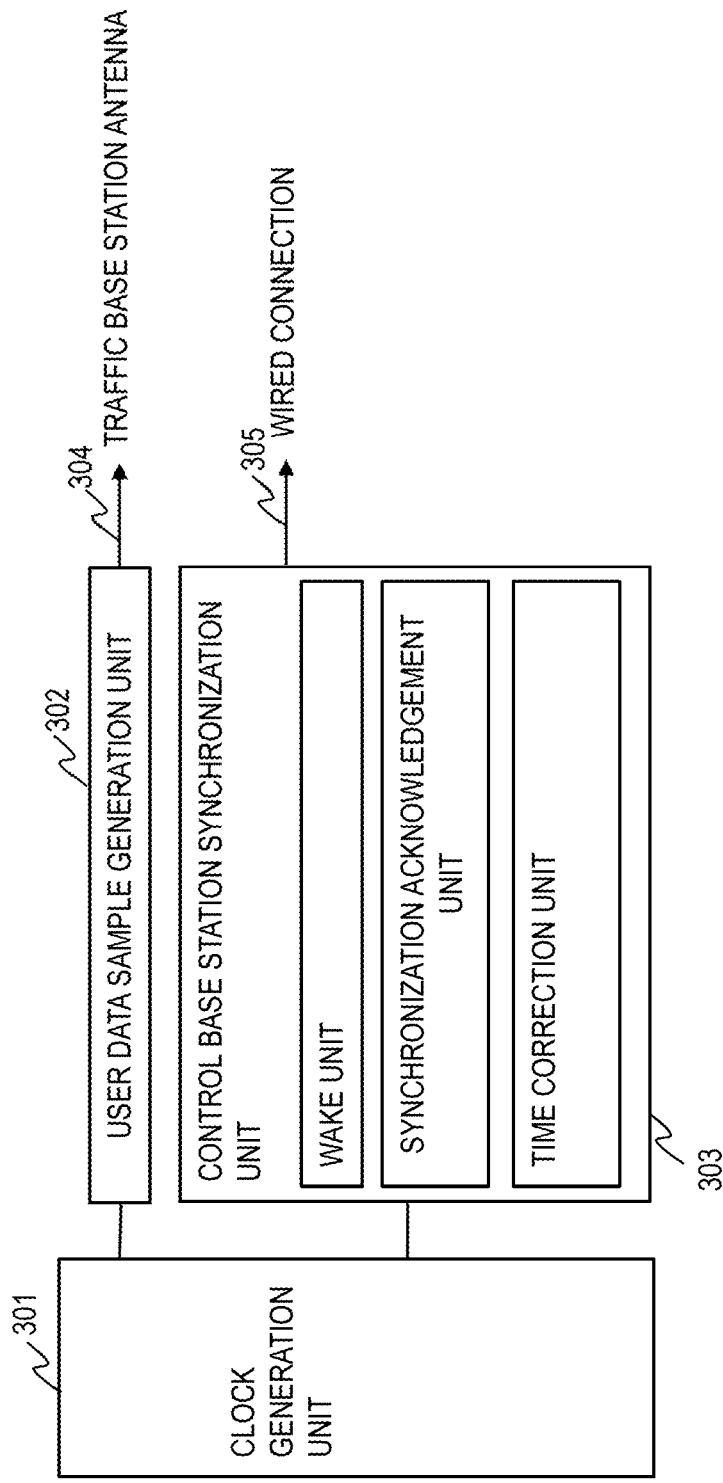
FIG. 3 is a structural block diagram of a traffic base station synchronization apparatus under separation architecture of the present embodiment.

FIG. 3 is a synchronization apparatus in a traffic base station of the present embodiment. The apparatus comprises: control base station synchronization unit 303, to obtain time information from a control base station through a wired connection 305, to provide to a local clock generation unit 301; clock generation unit 301, to adjust a clock of the local traffic base station based on the highly precise time information provided by the control base station synchronization unit 303, to correct the time error; user data sample generation unit 302, to generate data required by a mobile user including a network time adjustment information, and transmit to a mobile user equipment 104 through a traffic base station antenna 304, to provide synchronization support and traffic dada for the mobile user equipment 104. Wherein the control base station synchronization unit 303 comprises:

wake unit, to transmit a base station awake message to the control base station through a wired connection 305 in the case that the traffic base station in a sleep state is waked up into an awake state; synchronization acknowledgement unit, to transmit a synchronization acknowledgement message to the control base station through the wired connection 305; time correction unit, to transmit a base station time correction message to the control base station through the wired connection 305.

The bottom layer (the third layer) of the network consists of mobile user equipments. The mobile user equipments take various forms, such as cellphones, tablet computers, wearable devices, etc. The mobile user equipments communicate with the network through wireless links of over-the-air interfaces. In particular, guarantee for the network coverage of the mobile user equipments is provided by the control base station which is always open, while the high rate data transmission of the mobile user equipments is provided as needed by one or more traffic base stations under the control of the control base station.

Figure 4:
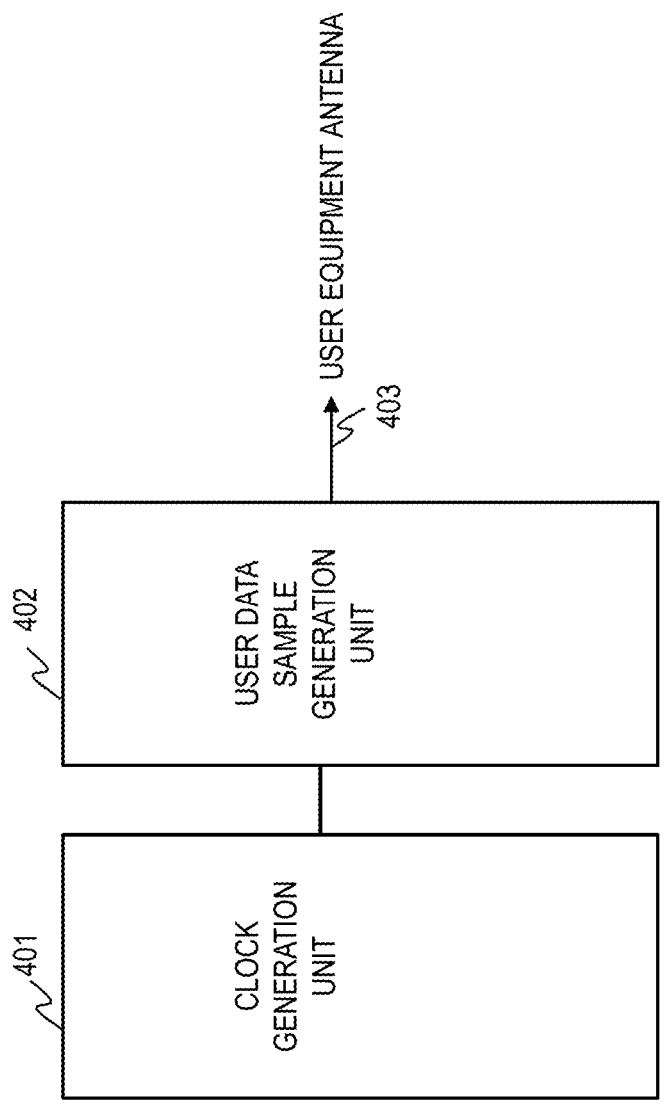
FIG. 4 is a structural block diagram of a mobile user equipment synchronization apparatus under separation architecture of the present embodiment.

FIG. 4 is a synchronization apparatus in a mobile user equipment of the present embodiment. The apparatus includes: a clock generation unit 401, to adjust a clock of the local traffic base station based on the highly precise time information provided by the control base station 102 and the traffic base station 103, to correct the time error; a user data sample generation unit 402, to generate data which is communicated by the mobile user with the base station, and receive the synchronization information and traffic data provided by the control base station 102 and the traffic base station 103 through a user equipment antenna 403.

The protocol between the $0^{th}$ layer and the $1^{st}$ layer of the present embodiment works as follows: GNSS receiver at the control base station 102 side receives GNSS signals 105 broadcasted by the $0^{th}$ layer, decodes the time information therein and calculates the time offset, then adjusts the master clock compensation offset of the control base station 102. After successful adjustment, a "synchronized" message will be recorded in the log. When there is no "synchronized" message for a preset period of time (e.g., ten minutes), then an "out of synchronization" message is triggered, and the control base station will be put into maintenance state.

The signaling interaction between the first layer (control base station 102) and the second layer (traffic base station 103) is described in detail below. Compared with the schemes in existing patent references which use wired connection to achieve synchronization, the main contributions of the present embodiment are as follows. First, it provides a fast and efficient synchronization scheme (including methods for calculating the required time information) for the sleep nodes which are out of synchronization. Second, signaling messages have been set for fast, reliable and synchronous distributed time offset calculation and centralized synchronization state monitoring.

Figure 5A:
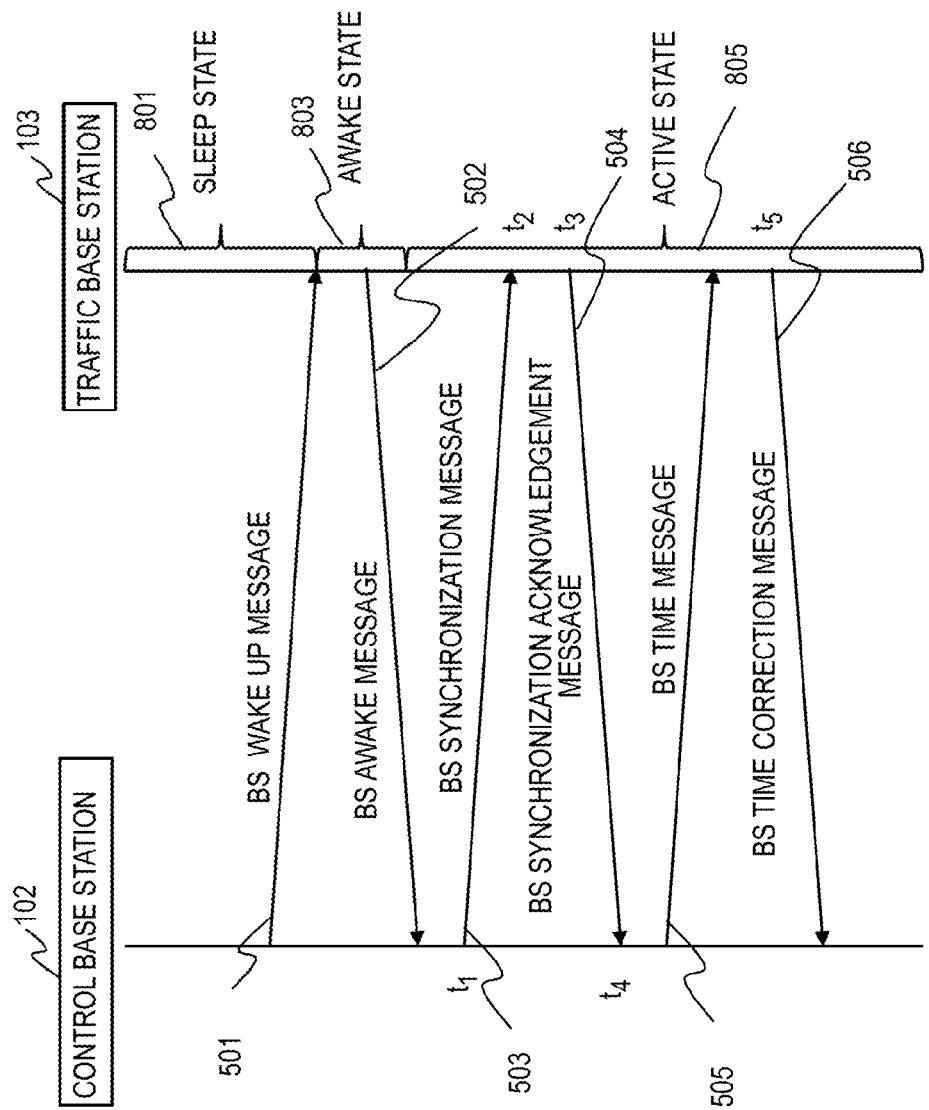
FIG. 5A is an exemplary diagram of a signaling interaction for the synchronization between the first layer (control base station) and the second layer (traffic base station) of the present embodiment.

FIG. 5A is an exemplary diagram of signaling interaction for the synchronization between the first layer (control base station) and the second layer (traffic base station) of the present embodiment. When the control base station 102 wakes-up a traffic base station 103 in sleep state, the base station wake up unit transmits a base station wake up message 501 through the wired connection 207. A preset timestamp $t_{pre}$ is carried in the message, which equals to the transmission time of the base station wake up message 501 plus a pre-calculated wired transmission average delay $d_{avg}$ between the control base station and the traffic base station:

$$t_{pre} = t_{send} + d_{avg},$$

The calculation method of $d_{avg}$ will be given below. When the traffic base station in a sleep state 801 receives the base station wake up message 501 through the wake unit, it will be waked up into an awake state 803, and set its own current time to $t_{pre}$, and reply with a base station awake message 502 through the wake unit. After the control base station transmits the base station wake up message 501, it starts a preset timer TIMER1 to wait for the base station awake message 502 of the traffic base station.

After transmitting the base station awake message 502, the traffic base station enters the active state 805. The control base station will periodically broadcast its time information through the base station synchronization acknowledgement unit to the traffic base stations governed by this control base station, such a message is referred to as base station synchronization message 503. The base station synchronization message 503 carries a timestamp $t_1$ at which the message is transmitted at the control base station side. After the traffic base station receives the base station synchronization message 503 through the synchronization acknowledgement unit, it will record a reception time $t_2$ at the traffic base station side, and then reply with a base station synchronization acknowledgement message 504 through the synchronization acknowledgement unit. The message 504 will carry $t_1$ and $t_2$ as well as a transmission time $t_3$ at which the traffic base station transmit the base station synchronization acknowledgement message 504. After the control base station transmits the base station synchronization message 503, it will start a timer TIMER2 to wait for the base station synchronization message 504 of the traffic base station. When the control base station receives the base station synchronization acknowledgement message 504, it will record its own reception time $t_4$.

In some existing patent references, a synchronization node recording the $t_4$ (corresponding to the first layer under separation architecture, i.e., the control base station) calculates the time offset. Different from that, the present embodiment employs a scheme for distributed time offset calculation. In particular, each traffic base station respectively calculates its own time offset relative to the control base station. Since one control base station is responsible for a number of traffic base stations in conventional network deployment, distributed calculation of the time offset may reduce the calculation burden at the control base station side. Moreover, this scheme also enables the payload field of the signaling message to employ a simple incremental structure: new timestamp can be directly attached after the existing timestamps. Therefore, the synchronization of the control base station and the traffic base station may be more fast and reliable. Under the scheme of distributed time offset calculation, the control base station replies to the traffic base station with a base station time message 505 through the base station time correction unit, where the message 505 carries all the above timestamps from $t_1$ to $t_4$. After the time correction unit receives the base station time message 505, the clock generation unit at the traffic base station side will calculate its own time offset according to the following equation, $$t_{off}=(t_2-t_1-t_4+t_3)/2$$

and correct its own time according to the following equation:

$$t_{cor}=t-t_{off}$$

After the time correction, the traffic base station replies to the control base station with a base station time correction message 506 through the time correction unit. The base station time correction message 506 contains all the above timestamps from $t_1$ to $t_4$, and also contains the transmission time $t_5$ of this message, as well as the current traffic base station ID (e.g. 001). After the control base station transmits the base station time message 505, it will start a timer TIMER3 to wait for the base station time correction message 506. After the message is received, the control base station records a successful synchronization log like "the traffic base station 001 is synchronized at $t_5$". In addition, the traffic base station time correction unit of the control base station also utilizes the timestamps carried in the base station time correction message 506 to calculate the delay of the wired connection between the control base station and the traffic base station:

$$d=(t_2-t_1+t_4-t_3)/2$$

After accumulating a certain amount history data of the delay d, the control base station calculates the average delay $d_{avg}$ to various traffic base stations. This average delay will be used in the calculation of the above-mentioned preset time to wake up a sleep base station.

Figure 5B:
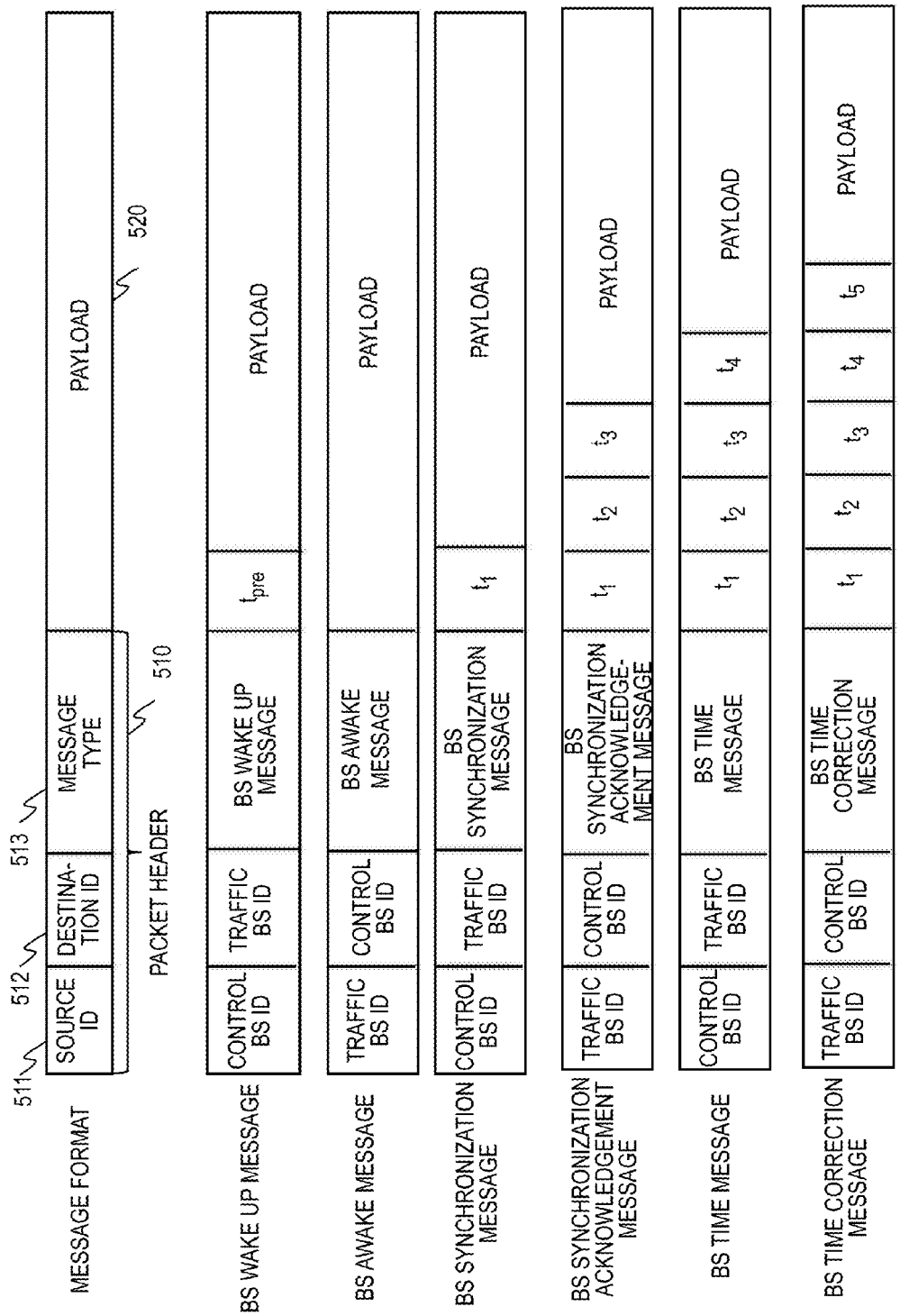
FIG. 5B is an exemplary diagram representing a signaling message format for the synchronization between the first layer (control base station) and the second layer (traffic base station) of the present embodiment.

FIG. 5B represents an exemplary diagram of the signaling message format for the synchronization between the first layer (control base station) and the second layer (traffic base station) of the present embodiment. As illustrated in FIG. 5B, the signaling message for the synchronization between the control base station and the traffic base station includes a packet header 510 and a payload 520. Wherein, the packet header 510 includes a source ID 511 representing a transmission source, a destination ID 512 representing a transmission destination, and a message type 513. As illustrated in the Figure, the payload field 520 of the base station wake up message, the base station awake message, the base station synchronization message, the base station synchronization acknowledgement message, the base station time message and the base station time correction message employs a simple incremental structure, i.e., new timestamp can be directly attached after the existing timestamps. Thus, the synchronization between the control base station and the traffic base station is made more fast and reliable.

Figure 6:
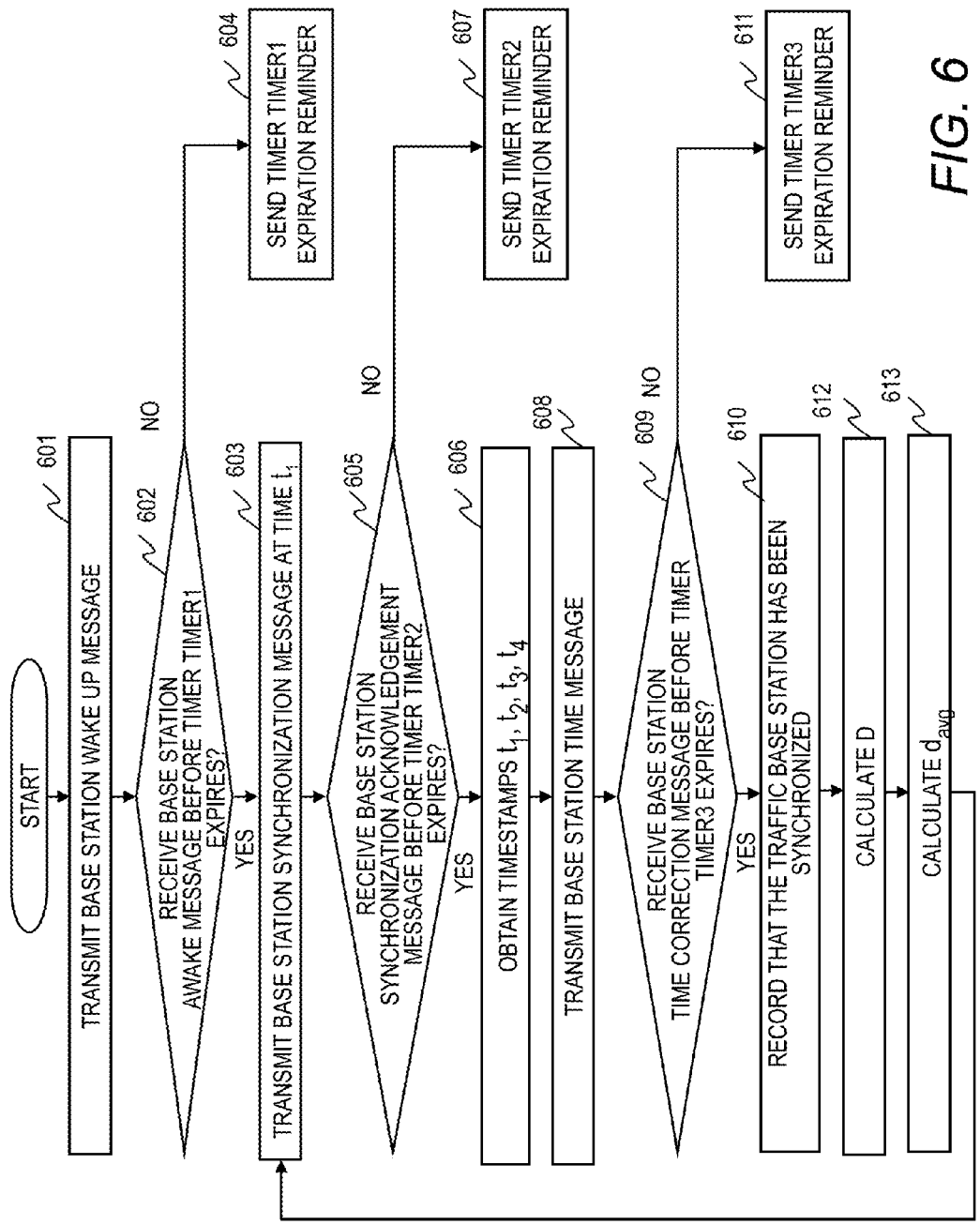
FIG. 6 is an exemplary flow chart of a control base station while synchronizing the first layer (control base station) and the second layer (traffic base station) of the present embodiment.

FIG. 6 is an exemplary algorithm diagram of a control base station while synchronizing the first layer (control base station) and the second layer (traffic base station) of the present embodiment. When it requires to wake up a traffic base station to provide high rate data service, the control base station proceeds to step 601 to transmit a base station wake up message 501, and start a timer TIMER1 to proceed to step 602. In step 602, the control base station determines whether a base station awake message 502 is received before the timer TIMER1 expires. If so, the control base station proceeds to step 603. Otherwise, the control base station proceeds to step 604. In step 603, the control base station transmits a base station synchronization message 503 carrying timestamp $t_1$. In step 604, the control base station sends a timer TIMER1 expiration reminder. After step 603 is finished, the control base station proceeds to step 605. In step 605, the control base station determines whether a base station synchronization acknowledgement message is received before a timer TIMER2 expires. If so, the control base station proceeds to step 606. Otherwise, the control base station proceeds to step 607. In step 606, the control base station records a reception time $t_4$, thereby obtaining all the time information from $t_1$ to $t_4$, and proceed to step 608. In step 607, the control base station sends a timer TIMER2 expiration reminder. In step 608, the control base station transmits a base station time message 505, then proceeds to step 609. In step 609, the control base station determines whether a base station time correction message 506 is received before a timer TIMER3 expires. If so, proceed to step 610. Otherwise, the control base station proceeds to step 611. In step 610, the control base station records in the log that the traffic base station is synchronized, and then proceeds to step 612. Whereas in step 611, send a timer TIMER3 expiration reminder. In step 612, the control base station utilizes the above timestamps and equations to calculate the delay d, and proceeds to step 613. In step 613, the control base station utilizes the history data to calculate the average delay $d_{avg}$.

Figure 7:
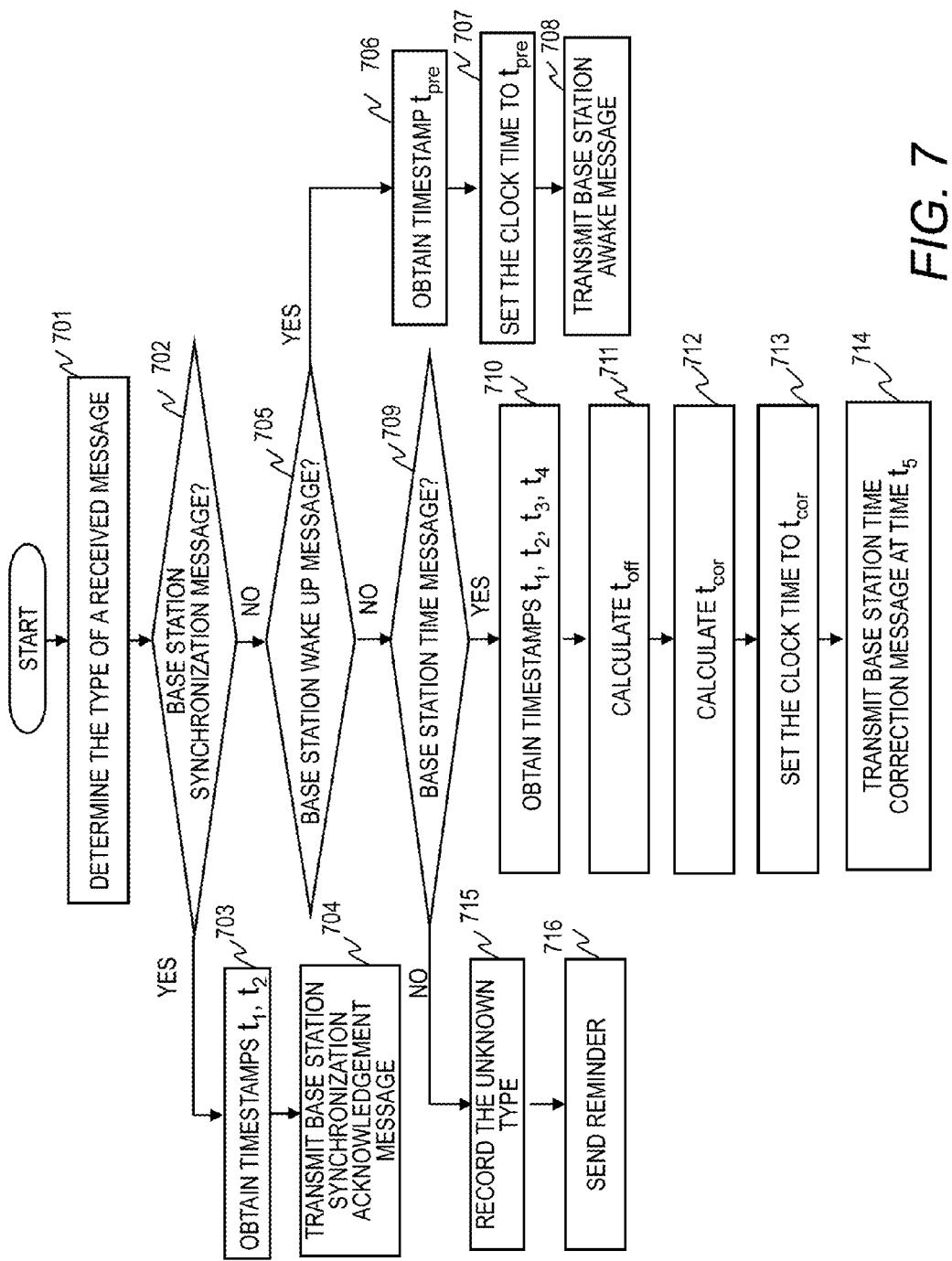
FIG. 7 is an exemplary flow chart of a traffic base station while synchronizing the first layer (control base station) and the second layer (traffic base station) of the present embodiment.

FIG. 7 is an exemplary algorithm diagram of a traffic base station while synchronizing the first layer (control base station) and the second layer (traffic base station) of the present embodiment. First in step 701, the traffic base station determines the type of a received message. In step 702, the traffic base station determines whether the received message is a base station synchronization message 503. If so, the traffic base station proceeds to step 703 to obtain timestamps $t_1$ and $t_2$, then proceeds to step 704 to transmit a base station synchronization acknowledgement message 504. If the determination in step 702 is "NO", the traffic base station proceeds to step 705 to determine whether the received message is a base station wake up message 501. If so, the traffic base station proceeds to step 706 to obtain timestamp $t_{pre}$, and then proceeds to step 707 to set the clock time of the traffic base station to $t_{pre}$, then proceeds to step 708 to transmit a base station awaken message 502. If the determination in step 705 is "NO", the traffic base station proceeds to step 709 to further determine whether the received message is a base station time message 505. If so, the traffic base station proceeds to step 710. Otherwise, the traffic base station proceeds to step 715. In step 710, the traffic base station obtains all the time information from $t_1$ to $t_4$; then proceeds to step 711 to calculate the time offset $t_{off}$; then proceeds to step 712 to utilize the above equations to calculate the $t_{cor}$; after which, proceeds to step 714 to transmit a base station time correction message 506. Whereas in step 715, the traffic base station records the unknown type in the log and proceeds to step 716. In step 716, the traffic base station sends a reminder that the traffic base station receives an unknown type of message.

Figure 8:
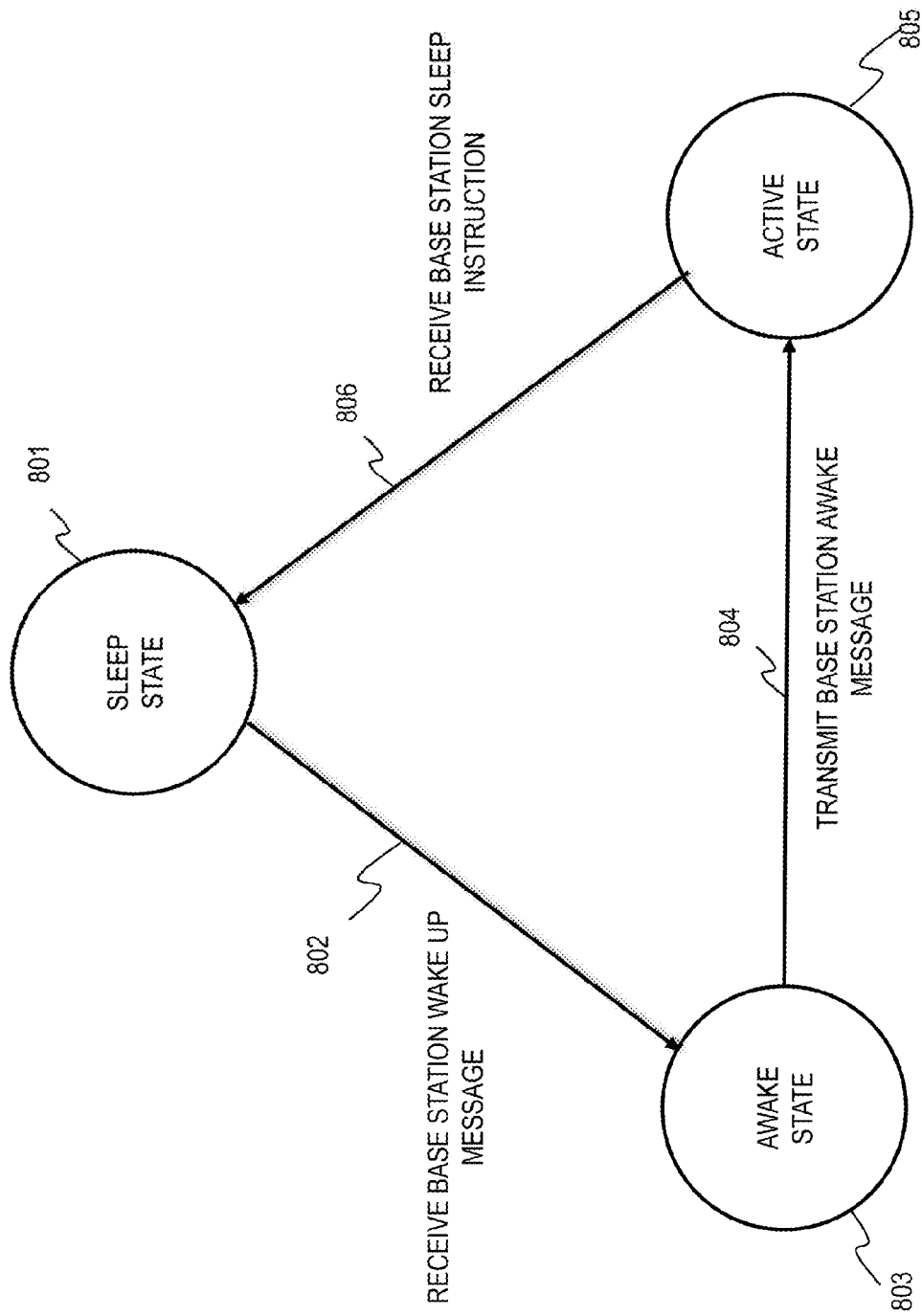
FIG. 8 is an exemplary diagram of the state transfer for a traffic base station under separation architecture of the present embodiment.

FIG. 8 is an exemplary illustration representing the state transfer for a traffic base station under separation architecture. The state which a traffic base station is in is one of the following three: sleep state 801, awake state 803 and active state 805. It is noted that the active state 805 here include a phase in which the base station has been open and providing data service for users, and also include a phase in which the base station has been open but not providing data service for users. The transfer relationships of the traffic base station among three states are: When the traffic base station is in the sleep state 801, if a base station wake up message 501 from the control base station is received, the traffic base station will be waked up 802, and enters the awake state 803. In state 803, the traffic base station will transmit a base station awake message 502, and enter the active state 805 through state transfer 804. In the active state 805, after the traffic base station receives a sleep instruction from the control base station, it returns to the sleep state 801 through state transfer 806.

It is worth mentioning that, by the synchronization protocol between the control base station and the traffic base station in the present embodiment, the traffic base stations do not need to directly connect to GNSS receivers, thereby the traffic base stations can be relatively simple and inexpensive, making it easy to deploy them in environments such as indoor and underground more intensively.

In addition, it is worth mentioning that, by employing wired connection synchronization, the frequency synchronization between the control base station and the traffic base station may directly utilize the physical layer waveforms to synchronize under the condition provided by the underlying network infrastructure (e.g., in a situation where Synchronous Ethernet (SyncE) is used.) When the underlying network infrastructure has no synchronization support for the physical layer waveforms, the frequency synchronization can be achieved by the above signaling interaction.

In addition, it is worth mentioning that, the above timers TIMER1, TIMER2, TIMER3 are distinguished by logical function. In implementation, multiple dependent timers or fewer (including single) timer(s) can be used as needed. The default values of these timers are dependent on the implementation. For example, set the default values of the timers according to the particular implementation of the wired network and based on the empirical values of wired link delay under specific implementation as well as typical calculation performance of the traffic base stations. Moreover, the values of the timers may be configured and modified in network operation maintenance.

In addition, it is worth mentioning that, the above messages such as the base station wake up message 501 which are conveyed between the control base station and the traffic base station through wired link may utilize (but not limited to) the interface protocols in existing network standards, such as the X1 interface in LTE network.

Figure 9A:
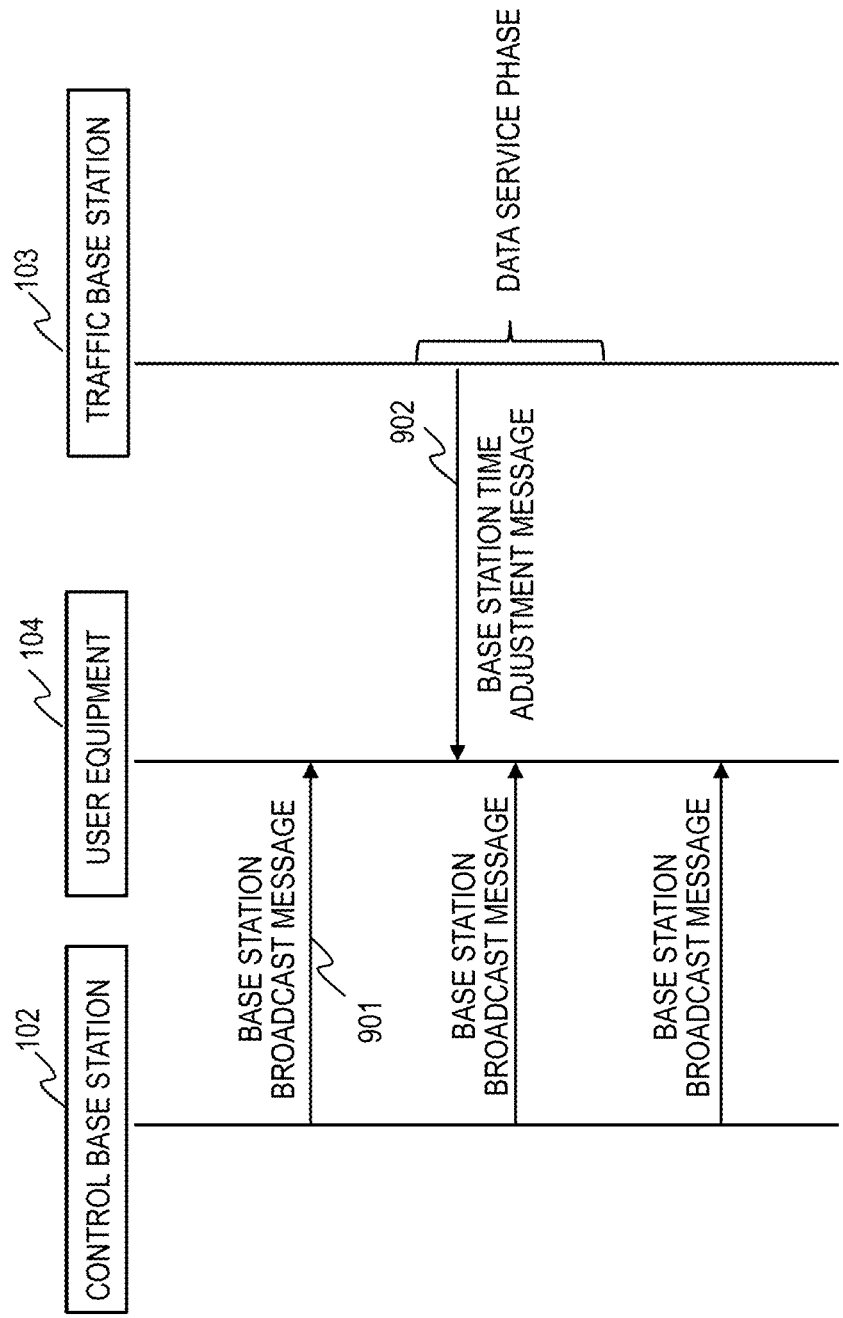
FIG. 9A is an exemplary diagram of signaling interaction for synchronizing the third layer (mobile user equipment) of the present embodiment.
Figure 9B:
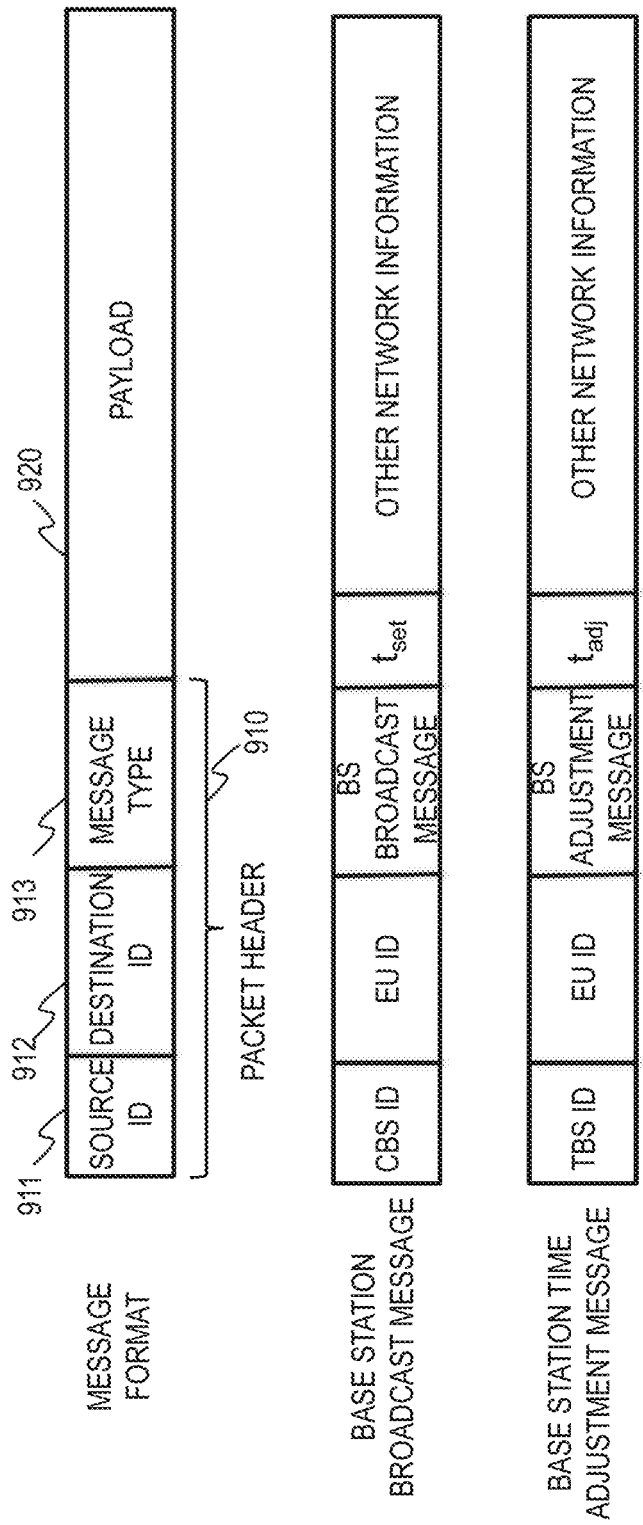
FIG. 9B is an exemplary diagram of signaling message format for synchronizing the third layer (mobile user equipment) of the present embodiment.

In the present embodiment, the synchronization of the third layer (mobile user equipment) is provided by two layers: the first layer (control base station) and the second layer (traffic base station). FIG. 9A is an exemplary diagram of signaling interaction for synchronizing the third layer (mobile user equipment) of the present embodiment. A control base station 102 periodically broadcasts a base station broadcast message 901 to mobile user equipments 104 accessing the network. Wherein as illustrated in FIG. 9B, the base station broadcast message 901 includes a packet header 910 and a payload 920; wherein, the packet header 910 includes a control base station ID 911 as transmission source, a user equipment ID 912 as transmission destination, and a base station broadcast message 913 as message type; the payload 920 of the base station broadcast message includes a timestamp $t_{set}$ at which the control base station transmit the base station broadcast message, as well as other network information. Wherein, the precision of the embedded time information $t_{set}$ needs to be within the requirement range of the mobile user equipment real-time applications. After the mobile user equipment received and properly decoded the time information $t_{set}$, it will adjust its own clock to the provided highly precise time.

When a mobile user equipment is in high rate data transmission with one or more traffic base stations 103, the traffic base station may measure the time difference (i.e., time adjustment amount $t_{adj}$) between the traffic base station and the mobile user equipment, and transmit a base station time adjustment message 902 to the mobile user equipment. As illustrated in FIG. 9B, the base station time adjustment message 902 includes a packet header 910 and a payload 920; wherein, the packet header 910 includes a traffic base station ID 911 as transmission source, a user equipment ID 912 as transmission destination, and a base station time adjustment message 913 as message type; the payload field 920 of the base station time adjustment message includes a time adjustment amount $t_{adj}$ measured by the traffic base station, as well as other network information. The mobile user equipment adjusts its own time through the following equation according to the received time adjustment amount $t_{adj}$, thereby further achieving more precise synchronization:

$$t_{abs}=t-t_{adj}$$

where $t_{abs}$ represents the corrected clock of the mobile user equipment.

Figure 10:
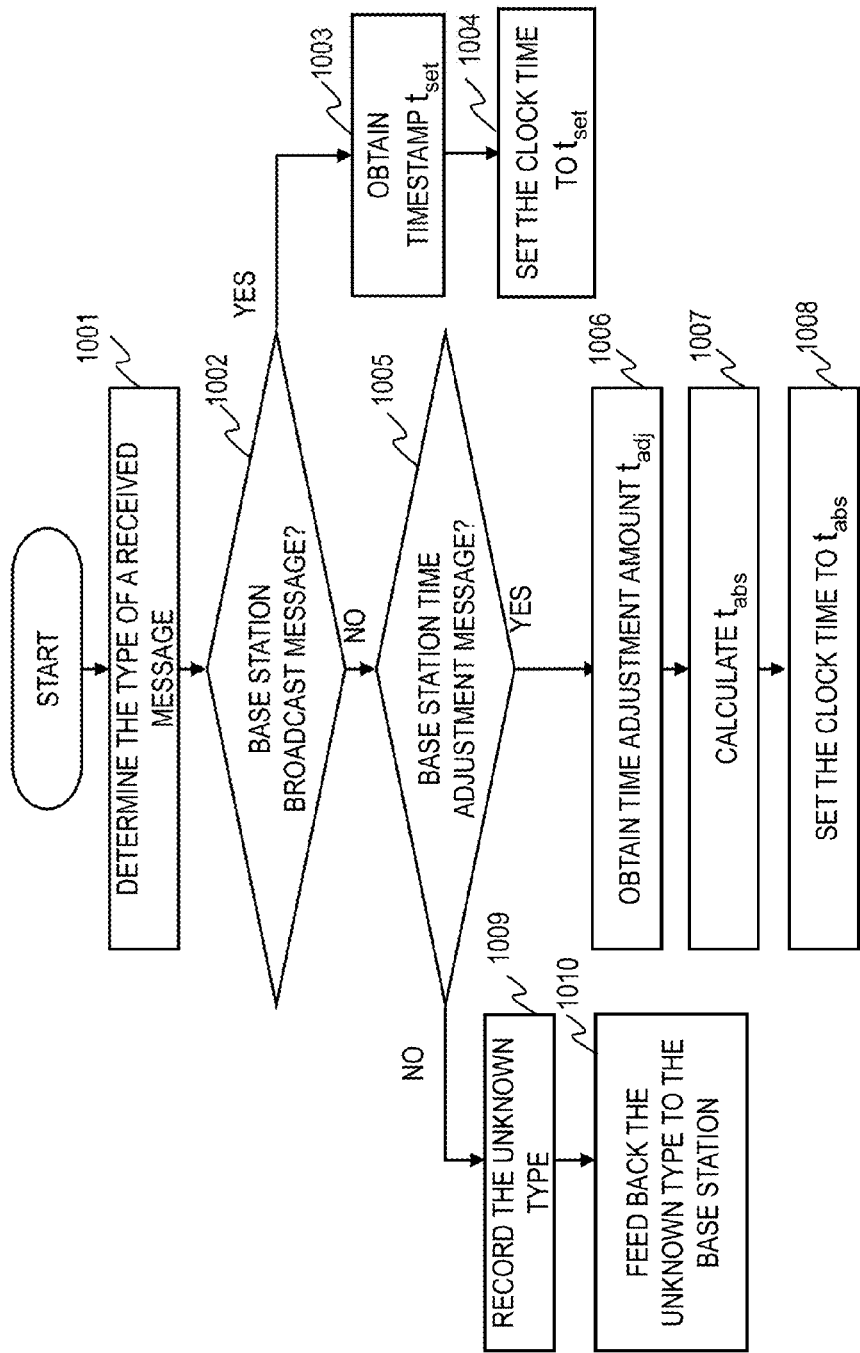
FIG. 10 is a flow chart for synchronizing the third layer (mobile user equipment) of the present embodiment.

FIG. 10 is a flow chart for synchronizing the third layer (mobile user equipment) of the present embodiment. First, in step 1001, the mobile user equipment determines the type of a received massage. In step 1002, the mobile user equipment determines whether the received message is a base station broadcast message 901 from a control base station. If the determination is "YES", the mobile user equipment proceeds to step 1003 to obtain a timestamp $t_{set}$. Then the mobile user equipment proceeds to step 1004, where the mobile user equipment adjusts its own clock to $t_{set}$. If the determination in step 1002 is "NO", the mobile user equipment proceeds to step 1005, where the mobile user equipment determines whether the received message is a base station time adjustment message 902 from a traffic base station. If the determination is "YES", the mobile user equipment proceeds to step 1006 to obtain a time adjustment amount $t_{adj}$ from the traffic base station. Then the mobile user equipment proceeds to step 1007 to calculate a corrected time $t_{abs}$. In step 1008, the mobile user equipment set its own time to $t_{abs}$. If the determination in step 1005 is "NO", the mobile user equipment proceeds to step 1009 to record the type of the received message as unknown type and proceeds to step 1010. In step 1010, the unknown type is fed back to the base station.

As illustrated above, by the first layer (control base station) guaranteeing basic synchronization requirement and the second layer (traffic base station) improving the synchronization precision, this cross-layer synchronization mechanism provides more flexible and reliable synchronization for mobile user equipment than traditional schemes.

Furthermore, the above cross-layer synchronization mechanism can be expanded to providing flexible and reliable synchronization for different types of mobile user equipments. For example, in a body area network scenario, in addition to cellphone, a user also carries a number of wearable devices. The scheme for synchronizing the mobile user equipment with cellular network is as follows. First, the cellphone obtain synchronization with the cellular network under separation architecture through the above signaling procedure. Then, in the body area network, the identity of the cellphone becomes the above "control base station". One of a pair of nodes in communication with each other serves as a "traffic base station", the other one is equivalent to the "mobile user equipment". That is, the cellphone periodically broadcasts time information in the body area network. The node serving as a "traffic base station" transmits a time adjustment message to the other node. This enables that the synchronization of multiple mobile user equipments and the cellular network under separation architecture is achieved.

According to the cellular network synchronization apparatus and schemes under separation architecture of the embodiment, the separation architecture, the supporting resources of the network are fully utilized. Various synchronization requirements with strict high precision and flexibility can be met under the condition of maintaining limited complexity and cost. The present embodiment resolves a big practical problem under separation architecture, enabling the flexible and efficient operation of cellular network under separation architecture to be effectively accomplished.

The present invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or a solid state drive, or a storage medium such as an IC card, or an SD card.

What is claimed is:

1. A synchronization apparatus in a control base station comprising:
    a Global Navigation Satellite System (GNSS) synchronization unit configure to receive a GNSS signal through a GNSS antenna to obtain time information;
    a clock generation unit configured to adjust a clock of the control base station based on the time information provided by the GNSS synchronization unit;
    a traffic base station synchronization unit configured to transmit and receive information with a traffic base station through a wired connection, wherein
    on condition that a base station awake message from the traffic base station is determined to be received before a preset first timer expires, a traffic base station synchronization acknowledgement unit transmits a base station synchronization acknowledgement message to the traffic base station, and
    wherein, the base station synchronization message comprises:
    a control base station ID representing a transmission source;
    a traffic base station ID representing a transmission destination; and
    a message type, and a timestamp $t_1$ representing a time at which the traffic base station synchronization acknowledgement unit transmit the base station synchronization message; and
    a user data sample generation unit configured to generate data required by a mobile user including network time information, and transmit the data to the mobile user equipment through a control base station antenna.

2. The synchronization apparatus in a control base station according to claim 1, wherein the traffic base station synchronization unit comprises:
    a traffic base station wake up unit configured to send the base station wake up message to the traffic base station in a sleep state through the wired connection;
    the traffic base station synchronization acknowledgement unit to send the base station synchronization message to the traffic base station which has entered an active state through the wired connection; and
    a traffic base station time correction unit configured to send a base station time message to the traffic base station through the wired connection.

3. The synchronization apparatus in a control base station according to claim 2,
wherein the base station wake up message comprises:
a control base station ID representing a transmission source;
a traffic base station ID representing a transmission destination;
a message type; and
a preset timestamp $t_{pre}$.

4. The synchronization apparatus in a control base station according to claim 2,
wherein, after the traffic base station wake up unit sends the base station wake up message, the control base station starts the preset first timer to wait for the base station awake message from the traffic base station.

5. The synchronization apparatus in a control base station according to claim 1,
wherein, after the traffic base station synchronization acknowledgement unit transmits the base station synchronization message, the control base station starts a preset second timer to wait for the base station synchronization acknowledgement message from the traffic base station, and
wherein, on condition that the traffic base station synchronization unit receives the base station synchronization acknowledgement message from the traffic base station, the control base station records a second reception time $t_4$ at which the base station synchronization acknowledgement message is received.

6. The synchronization apparatus in a control base station according to claim 5,
wherein, on condition that the base station synchronization acknowledgement message from the traffic base station is determined to be received before the preset second timer expires, the traffic base station time correction unit transmits the base station time message to the traffic base station, and
wherein the base station time message comprises:
a control base station ID representing a transmission source;
a traffic base station ID representing a transmission destination;
a message type;
the timestamp $t_1$;
a first reception time $t_2$ representing a time at which the traffic base station receives the base station synchronization message;
a first transmission time $t_3$ representing a time at which the traffic base station transmits the base station synchronization acknowledgement message; and
a second reception time $t_4$ representing a time at which the control base station receives the base station synchronization acknowledgement message.

7. The synchronization apparatus in a control base station according to claim 6,
wherein, after the traffic base station time correction unit transmits the base station time message, the control base station starts a preset third timer to wait for the base station time correction message from the traffic base station, and
wherein, on condition that the base station time correction message is determined to be received before the third timer expires,
the control base station records that the traffic base station has been synchronized, and
the traffic base station time correction unit calculates a delay of the wired connection between the control base station and the traffic base station based on a first reception time $t_2$ representing a time at which the traffic base station receives the base station synchronization message, a first transmission time $t_3$ representing a time at which the traffic base station transmits the base station synchronization acknowledgement message, and a second reception time $t_4$ representing a time at which the control base station receives the base station synchronization acknowledgement message.

8. A synchronization apparatus in a traffic base station, comprising:
a control base station synchronization unit configured to transmit and receive information with a control base station through a wired connection;
wherein, on condition that a received message from the control base station is determined to be a base station wake up message, the traffic base station is waked up into an awake state, obtains a preset timestamp $t_{pre}$ contained in the base station wake up message, sets a clock time of the traffic base station to $t_{pre}$, and transmits a base station awake message to the control base station though a wake unit, and
wherein, after transmitting a base station awake message, the traffic base station enters an active state;
a clock generation unit configured to correct a clock of the traffic base station based on time information provided by the control base station synchronization unit; and
a user data sample generation unit configured to generate data required by a mobile user including a network time adjustment information, and transmit the data to a mobile user equipment through a traffic base station antenna.

9. The synchronization apparatus in a traffic base station according to claim 8,
wherein the control base station synchronization unit comprises:
the wake unit configured to transmit a base station awake message to the control base station through the wired connection on condition that the traffic base station in a sleep state is waked up into the awake state;
a synchronization acknowledgement unit configured to transmit a base station synchronization acknowledgement message to the control base station through the wired connection; and
a time correction unit configured to transmit a base station time correction message to the control base station through the wired connection.

10. The synchronization apparatus in a traffic base station according to claim 9,
wherein, on condition that a received message from the control base station is determined to be a base station synchronization message, the traffic base station records a first reception time $t_2$ at which the base station synchronization message is received, and transmits the base station synchronization acknowledgement message through the synchronization acknowledgement unit.

11. The synchronization apparatus in a traffic base station according to claim 10,
wherein the base station synchronization acknowledgement message comprises:
a traffic base station ID representing a transmission source;
a control base station ID representing a transmission destination;
a message type;

a timestamp $t_1$ representing a time at which the control base station transmits the base station synchronization message;

a first reception time $t_2$ representing a time at which the traffic base station receives the base station synchronization message; and a first transmission time $t_3$ representing a time at which the synchronization acknowledgement unit transmits the base station synchronization acknowledgement message.

12. The synchronization apparatus in a traffic base station according to claim 9, wherein, on condition that a received message from the control base station is determined to be a base station time message, the traffic base station obtains:

a timestamp $t_1$ representing a time at which the control base station transmits a base station synchronization message;

a first reception time $t_2$ representing a time at which the traffic base station receives the base station synchronization message;

a first transmission time $t_3$ representing a time at which the synchronization acknowledgement unit transmits the base station synchronization acknowledgement message; and a second reception time $t_4$ representing a time at which the control base station receives the base station synchronization acknowledgement message, which are included in the base station time message, and wherein the clock generation unit calculates a time offset of the traffic base station based on the timestamp $t_1$, the first reception time $t_2$, the first transmission time $t_3$, and the second reception time $t_4$, to correct a clock of the traffic base station.

13. The synchronization apparatus in a traffic base station according to claim 12, wherein the time correction unit transmits a base station time correction message to the control base station, and wherein the base station time correction message comprises:

a traffic base station ID representing a transmission source;

a control base station ID representing a transmission destination;

a message type;

the timestamp $t_1$;

the first reception time $t_2$;

the first transmission time $t_3$;

the second reception time $t_4$; and a second transmission time $t_5$ representing a time at which the time correction unit transmits the base station time correction message.

14. A cellular network synchronization method under separation architecture, comprising:

receiving, by a control base station, a Global Navigation Satellite System (GNSS) signal through a GNSS antenna to obtain time information;

adjusting, by the control base station, a clock of the control base station based on the time information;

transmitting and receiving, by the control base station, information with a traffic base station through a wired connection;

transmitting, by the control base station, a base station wake up message to the traffic base station in a sleep state;

receiving, by the control base station, a base station awake message transmitted by the traffic base station;

transmitting, by the control base station, a base station synchronization message to the traffic base station which has entered an active state;

receiving, by the control base station, a base station synchronization acknowledgement message transmitted by the traffic base station;

transmit, by the control base station, a base station time message to the traffic base station, and receive a base station time correction message transmitted by the traffic base station, wherein the base station time message comprises:

a control base station ID representing a transmission source;

a traffic base station ID representing a transmission destination;

a message type;

a timestamp $t_1$ representing a time at which the control base station transmits a base station synchronization message;

a first reception time $t_2$ representing a time at which the traffic base station receives the base station synchronization message;

a first transmission time $t_3$ representing a time at which the traffic base station transmits the base station synchronization acknowledgement message, and the second reception time $t_4$, and the method further comprising calculating, by the traffic base station, a time offset of the traffic base station based on the timestamp $t_1$, the first reception time $t_2$, the first transmission time $t_3$, and the second reception time $t_4$, to correct a clock of the traffic base station; and generating, by the control base station, data required by a mobile user including network time information, and transmitting the data to a mobile user equipment through a control base station antenna.

15. The synchronization method according to claim 14, further comprising:

receiving, by the mobile user equipment, data transmitted by the control base station including network time information and data transmitted by the traffic base station including a network time adjustment information through a user equipment antenna;

adjusting, by the mobile user equipment, a clock of the mobile user equipment based on the network time information provided by the control base station and the network time adjustment information provided by the traffic base station.

* * * * *